United States Patent [19]

Kim

[11] Patent Number: 6,028,641
[45] Date of Patent: Feb. 22, 2000

[54] DEVICE AND METHOD FOR GENERATING A STABLE SYSTEM CLOCK IN HDTV

[75] Inventor: Jin-Gyeong Kim, Seoul, Rep. of Korea

[73] Assignee: LG Electronics Inc., Seoul, Rep. of Korea

[21] Appl. No.: 08/862,963

[22] Filed: Jun. 3, 1997

[30] Foreign Application Priority Data

Jun. 3, 1996 [KR] Rep. of Korea .................. 96-19657

[51] Int. Cl.[7] .................................................. H04N 5/12
[52] U.S. Cl. ........................................ 348/537; 348/536
[58] Field of Search .................................. 348/500, 505, 348/512, 516, 521, 524, 526, 536, 537, 538, 534; 331/20, 46, 56; 375/362, 364, 368, 375, 376; H04N 5/04, 5/05, 5/06, 5/10, 5/12

[56] References Cited

U.S. PATENT DOCUMENTS 4,958,228  9/1990  Kutsuki ........................ 348/537

*Primary Examiner*—David E. Harvey

[57] ABSTRACT

Device and method for generating a clock in an HDTV receiver is disclosed, the device including a clock generating part for generating a plurality of clock signals and selecting one clock signal from the clock signals in agreement to a frame rate of a presently received video signal having a reference clock signal in response to a provided clock selecting signal, and a controlling part for providing the clock selecting signal at a time when phases of the selected one clock signal of just prior video signal and the reference clock signal of the presently received video signal are in agreement to each other, whereby a stable supply of display clock signal is made possible even when a video format of a received video signal is changed.

20 Claims, 5 Drawing Sheets

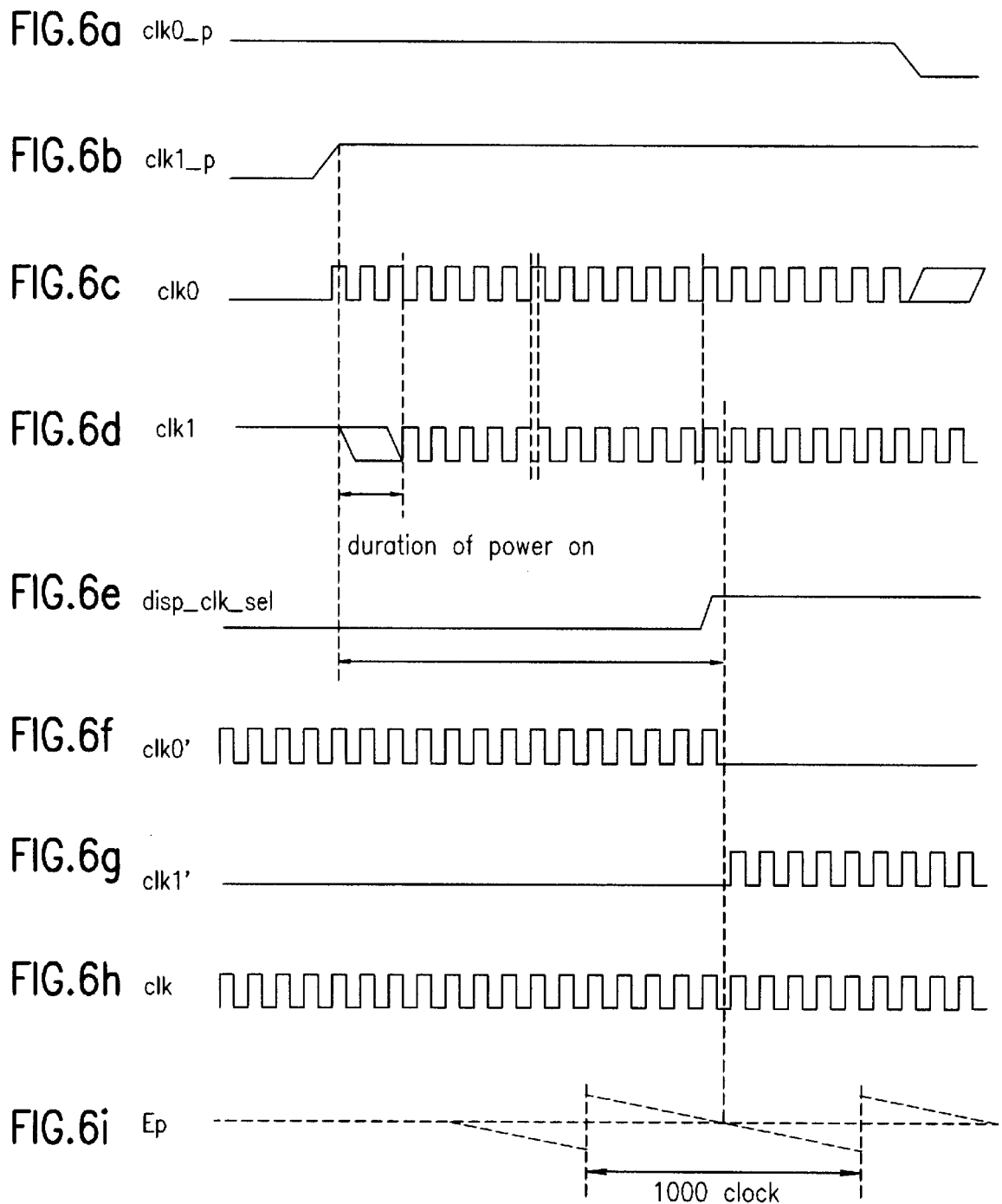

DEVICE AND METHOD FOR GENERATING A STABLE SYSTEM CLOCK IN HDTV

BACKGROUND OF THE INVENTION

1. Field of the Invention

The present invention relates to a digital TV receiver such as an HDTV(High Definition Television) receiver, and more particularly, to a device and method for generating a clock in an HDTV receiver.

2. Discussion of the Related Art

In order to fix standards for HDTV broadcasting, various steps have been taken recently to organize the Grand Alliance ("GA") in the U.S. and to finalize HDTV standards. While each of the existing video standards has an independent, single video format standard, the GA video standard accommodates many kinds of video formats, and is not limited to a single video format. In other words, in the digital television system, the GA format can accommodate video transmissions from various sources. For example, the transmitter can transmit video signals at a mix of 59.9 Hz and 60 Hz video frame rates(or display rates) in 27 MHz reference frequency. For restoring the clock signal at the receiver side, display clock signals should be changed to match the transmitted 59.9 Hz or 60 Hz video frame rates. Accordingly, the receiver side is required to have clock signals of different sampling frequencies for the different video formats, each of those clock signals should be in agreement with the clock signal used on the transmitter side, i.e., in the encoder, or their line frequencies or field or frame frequencies should be in agreement, exactly. As explained, all digital television sets require a device for restoring clock signals without fail, which can appropriately change the present clock signal into a clock signal in agreement with the display format. If the restoration of the clock signal is not perfect, an overall picture quality will be degraded.

Therefore, a conventional HDTV clock generating device restores the clock signal transmitted from the transmitter by way of time restoration in which the receiver at first restores the transmitted data loaded on a carrier according to each of the video formats transmitted from the transmitter. And, a restored clock signal is passed through a PLL(Phase Locked Loop) to generate a desired frequency.

The aforementioned conventional PLL will be explained with reference to the block diagram shown in FIG. 1. A conventional clock generating device in an HDTV receiver includes local oscillators 13a and 13b for respectively generating clock signals of different frequencies, a 1/1000 frequency divider 14a for dividing the frequency of the clock signal from the local oscillator 13a by 1/1000, a 1/1001 frequency divider 14b for dividing the frequency of the clock signal from the local oscillator 13b by 1/1001, a phase error detector 11 for receiving a reference clock signal and the clock signal 1/1000 or 1/1001 divided of the clock signals from the local oscillator 13a and 13b and comparing the clock signals with the reference clock signals to detect a phase error signal, a loop filter 12 for converting the phase error signal from the phase error detector 11 into a signal voltage for controlling the local oscillators 13a and 13b, a first selector 15a for selecting one from the local oscillators 13a and 13b in providing the control signal from the loop filter 12 depending on a video format of a received video signal, a second selector 15b for selecting one from the 1/1000 frequency divider 14a and 1/1001 frequency divider 14b in providing the 1/1000 or 1/1001 divider clock signal to the phase error detector 11 depending on a video format of a received video signal, a divider for system clock generating 16 for dividing outputs from the local oscillator 13a and 13b controlled by the control voltage from the loop filter 12 in generating a system clock signal, and a third selector 15c for selecting one from the outputs of the local oscillators 13a and 13b depending on the video format of the received video signal in providing one of the outputs to the divider for system clock generating 16.

If the frame rate of the conventional clock generating device in an HDTV receiver is 59.9 Hz, the local oscillator 13a generates a frequency signal of 4788 fH when the sampling frequency is 4788 fH, which is 1/1000 divided in the 1/1000 divider 14a to generate a frequency signal of 4.788 fH, identical to the reference clock signal. The local oscillator 13b generates a clock signal of 4788×(1001/1000), which is then 1/1001 divided in the 1/1001 divider 14b also to generate a frequency signal of 4.788 fh, identical to the reference clock signal, too. Thus, the selector 15c is used in selecting one clock signal from the two clock signals of the two local oscillators 13a and 13b depending on the video format of the received video signal. That is, when the video format of the received video signal has a frame rate of 59.94 Hz or 29.97 Hz, the selector 15c selects a signal from the local oscillator 13a, and when the video format of the received video signal has a frame rate of 30 Hz or 60 Hz, the selector 15c selects a signal from the local oscillator 13b. This selected clock signal can be used as a system clock signal after being demultiplied by the divider for system clock generating 16.

By adding conventional switching functions to the conventional PLL circuit, the conventional clock generating device in an HDTV receiver selectively restores a clock signal corresponding to a video format of a received video signal. In other words, the conventional clock generating device selects a suitable clock signal from the PLL circuit by switching between the local oscillators and dividers in the PLL and uses the selected clock signal as a system clock signal. However, the conventional clock generating device in an HDTV receiver has a problem in that the clock signal becomes unstable when the switch in the PLL is changed over. That is, because there happens a change of clock signal to a clock signal having a different frequency regardless of the immediately proceeding clock signal upon switching in the PLL, an error can be occurred in a switching section, and further a degradation of product reliability may be caused due to unstable subsequent process. Moreover, though there have been many suggestions on arts for generating a clock signal, there has been no suggestion on art for changing a clock signal depending on a frame rate of a video signal, i.e., video format. In the aforementioned digital television system, it is difficult to change a clock signal by means of the conventional art which uses a PLL. Eventually, when there is only one display clock signal in a transmitted broadcasting program, the display clock signal can be restored easily by using the conventional PLL, but exact restoration of display clock signals of different frequencies has been difficult.

SUMMARY OF THE INVENTION

Accordingly, the present invention is directed to a device and method for generating a clock signal in an HDTV receiver that substantially obviates one or more of the problems due to limitations and disadvantages of the related art.

One object of the present invention is to provide a device for generating a clock in an HDTV receiver, which can make a stable change and provision of a system clock signal even when a format of a received video signal is changed.

Another object of the present invention is to provide a device and method for generating a clock in an HDTV receiver, which can generate a system clock signal corresponding to a frame rate of a presently received video signal at a time when a frame rate of a just prior received video signal and the frame rate of the presently received video signal come to an agreement if the frame rates of these two video signals are different.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for generating a clock in an HDTV receiver includes a clock generating part for generating a plurality of clock signals and selecting one clock signal from the clock signals in agreement to a frame rate of a presently received video signal having a reference clock signal in response to a provided clock selecting signal, and a controlling part for providing the clock selecting signal at a time when phases of the selected one clock signal of just prior video signal and the reference clock signal of the presently received video signal are in agreement to each other.

In other aspect of the present invention, there is provided a method for generating a clock in an HDTV including the steps of determining a frame rate of a presently received video signal having a reference clock signal and a frame rate of a just prior received video signal of being in agreement, detecting a time when phases of a display clock signal of the just prior video signal and the reference clock signal of the present video signal are in agreement to each other, if the two signals are different from each other, and generating a new clock signal suitable for displaying the presently received video signal from the time of detection.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, an example of which is illustrated in the accompanying drawings.

Figure 1:
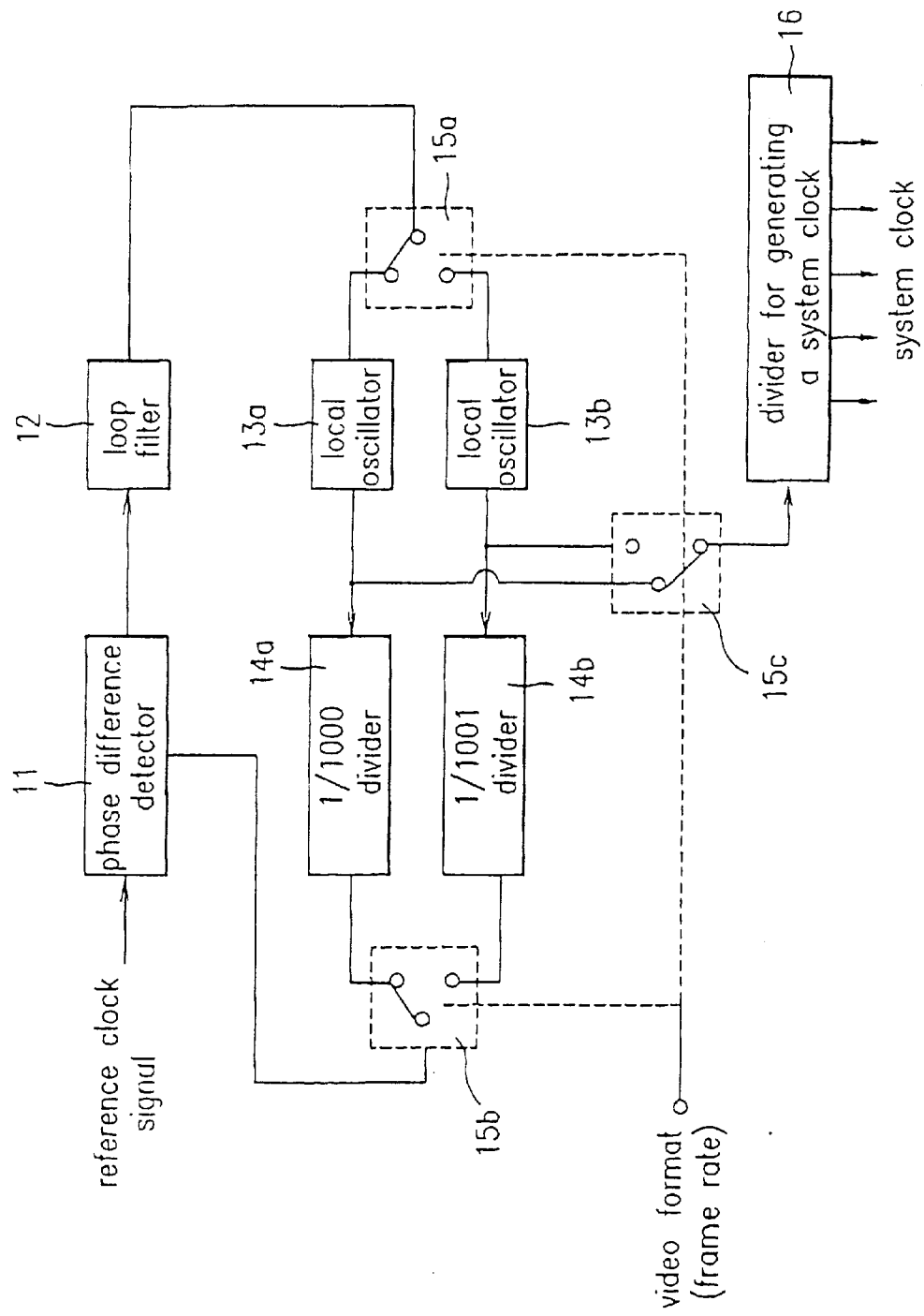
FIG. 1 illustrates a block diagram showing a system of a conventional device for generating a clock in an HDTV receiver.
Figure 2:
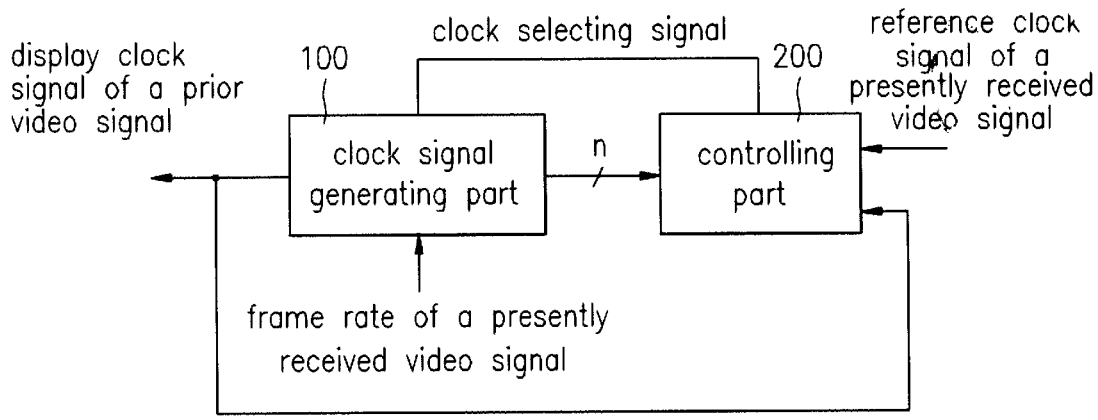
FIG. 2 illustrates a block diagram showing an outline of a system of a device for generating a clock in an HDTV receiver in accordance with a preferred embodiment of the present invention.
Figure 3:
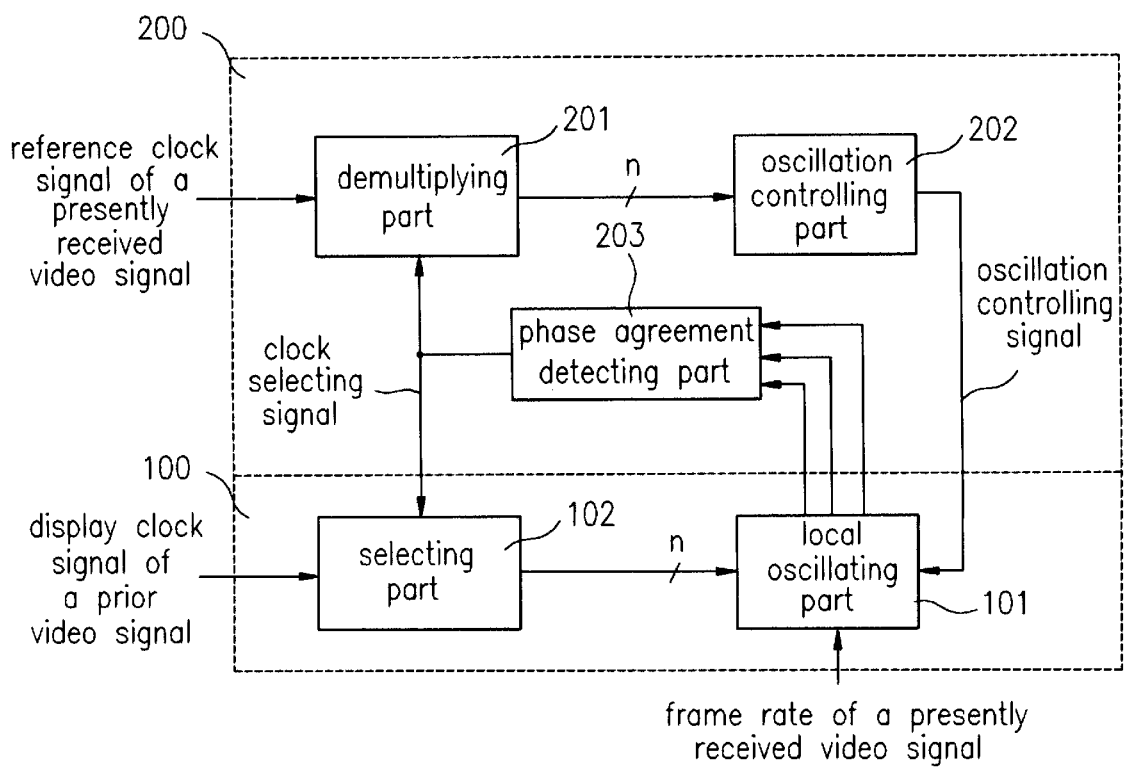
FIG. 3 illustrates a block diagram showing a detailed system of the device for generating a clock in an HDTV receiver in FIG. 2.
Figure 4:
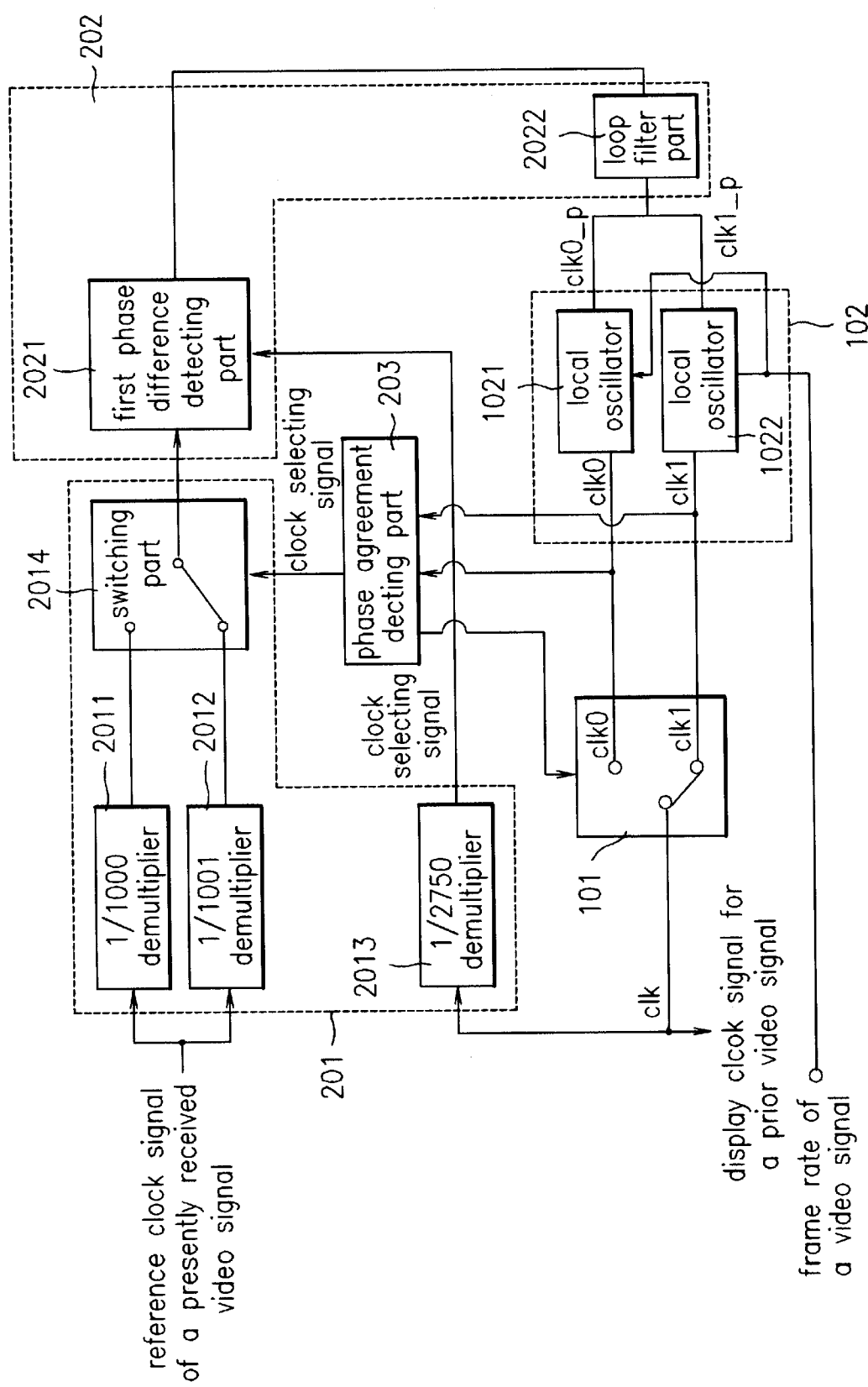
FIG. 4 illustrates a block diagram showing a detailed system of the device for generating a clock in an HDTV receiver in FIG. 3.
Figure 5:
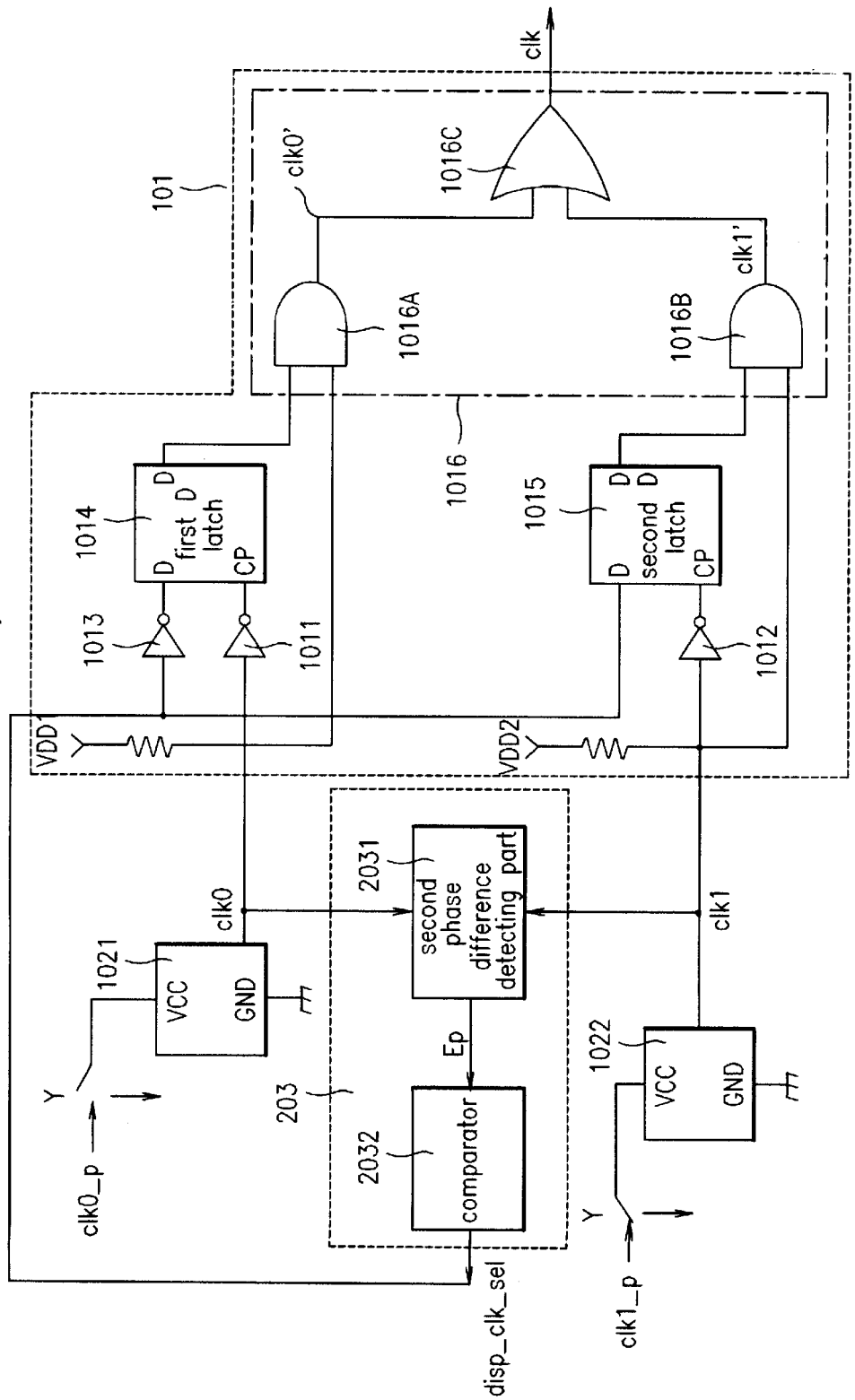
FIG. 5 illustrates a block diagram showing a detailed circuit of a part of the device for generating a clock in an HDTV receiver in FIG. 4; and, FIGS. 6a~6i illustrates timings for explaining the operation of the circuit shown in FIG. 5.

FIG. 2 illustrates a block diagram showing an outline of a system for generating a clock in an HDTV receiver in accordance with a preferred embodiment of the present invention, FIG. 3 illustrates a block diagram showing a detailed system for generating a clock in an HDTV receiver in FIG. 2, FIG. 4 illustrates a block diagram showing a detailed system for generating a clock in an HDTV receiver in FIG. 3, and FIG. 5 illustrates a block diagram showing a detailed circuit of a part of the device for generating a clock in an HDTV receiver in FIG. 4.

Referring to FIG. 2, the device for generating a clock in an HDTV receiver includes a clock signal generating part 100 for generating a plurality of clock signals and selecting one clock signal from the clock signals in agreement with a frame rate of a received video signal having a reference clock signal in response to a clock selecting signal, and a controlling part 200 for receiving the selected clock signal of a prior video signal and the reference clock signal of the presently received video signal and providing the clock selecting signal at a time when phases of the two received clock signals are matched to each other using the plurality of clock signals. In FIG. 2, the reference clock signal has a 27 MHz frequency, and the frame rates of the received video signals are 59.94 Hz and 60 Hz. Though only two kinds of frame rates are illustrated in this embodiment, the video signals may include more than two frame rates. Though it will be explained in detail later, the display clock signal of the presently received video signal is generated from a low section of the clock signal coming next to the time when phases of the reference clock signal and the clock signal of the prior video signal are in agreement to each other.

The operation of the parts shown in FIG. 2 will be explained.

The clock signal generating part 100 generates a plurality of clock signals and selects one clock signal from the clock signals in response to a clock selecting signal from the controlling part 200 and provides the selected clock signal to a display part(not shown) as a display clock signal of a presently received video signal. The controlling part 200 determines a frame rate of the presently received video signal and a frame rate of the prior received video signal of being different from each other according to a reference clock signal of the presently received video signal and the display clock signal of the prior video signal, and then, if the frame rates of the two video signals are different from each other, detects a time when phases of the reference clock signal of the presently received video signal and the display clock signal of the prior video signal are in agreement to each other. When detected, the controlling part 200 provides a clock selecting signal to the clock signal generating part 100, and the clock signal generating part 100 provides one of the plurality of clock signals suitable for display of the presently received video signal. Though not shown in FIG. 2, the display displays the presently received video signal using this new display clock signal.

Referring to FIG. 3, the device for generating a clock includes a local oscillating part 101 for generating frequency signals corresponding to a plurality kind of video signals having frame rates different from one another received at an HDTV receiver in response to a provided oscillating control signal, a selecting part 102 for selecting one frequency signal from the frequency signals as the display clock signal in response to the provided clock selecting signal, a dividing part 201 for dividing the reference clock signal of the presently received video signal by a first dividing rate and the display clock signal from the selecting part 102 by a second dividing rate to provide a first divided signal and a second divided signal, an oscillation controlling part 202 for detecting a phase difference between the first divided signal and the second divided signal and providing an oscillation controlling signal corresponding to the phase difference to the oscillating part 101, and a phase location detecting part 203 for providing the clock selecting signal at a time when phases of the plurality kind of frequency signals come to an agreement.

Referring to FIG. 4, the dividing part 201 in FIG. 3 includes a first divider 2011 for 1/1000 dividing the reference clock signal of the clock signal of the presently received video signal, a second divider 2012 for 1/1001 dividing the reference clock signal, a third divider 2013 for 1/2750 dividing the display clock signal from the selecting part 101 to provide the second divided signal, and a switching part 2014 for providing one of the signals from the first divider 2011 and the second divider 2012 as the first divided signal to the oscillation controlling part 202. The oscillation controlling part 202 shown in FIG. 3 includes a first phase difference detecting part 2021 for detecting a phase difference of the first divided signal and the second divided signal, and a loop filter part 2022 for providing a oscillation controlling signal corresponding to the phase difference. The local oscillating part 102 shown in FIG. 3 includes at least two local oscillators. As shown in FIG. 4, the local oscillating part 102 shown in FIG. 3 includes a first local oscillator 1021 for providing a 74.25 MHz frequency signal in response to the oscillation controlling signal and the frame rate signal of a provided video signal, and a second local oscillator 1022 for providing a 74.176 MHz frequency signal in response to the signals. And, referring to FIG. 5, the phase agreement detecting part 203 shown in FIG. 4 includes a second phase difference detecting part 2031 for detecting a phase difference of two frequency signals of the plurality of frequency signals from the local oscillating part 102 corresponding to the present video signal and the prior video signal, and a comparator 2032 for comparing a signal from the second phase difference detecting part 2031 and the reference signal in providing the clock selecting signal. The selecting part 101 shown in FIG. 4 includes a first inverter 1011 for inverting a first frequency signal of the plurality of frequency signals, a second inverter 1012 for inverting a second frequency signal of the plurality of frequency signals, a third inverter 1013 for inverting the clock selecting signal, a first latch 1014 for latching an output of the third inverter 1013 according to an output of the first inverter 1011, a second latch 1015 for latching the clock selecting signal according to an output of the second inverter 1012, and a multiplexer 1016 for selecting one from the first frequency signal and the second frequency signal in response to the outputs of the first, and second latches 1014 and 1015. And, as shown in FIG. 5, the multiplexer 1016 includes a first AND gate 1016A for receiving the first frequency signal and a signal from the first latch 1014, a second AND gate 1016B for receiving the second frequency signal and a signal from the second latch 1015, and an OR gate 1016C for receiving signals from the first, and second AND gates 1016A and 1016B and providing the clock selecting signal. In FIG. 5, each of the first, and second latches 1014 and 1015 may includes a D type flipflop.

The operation of the device for generating a clock in an HDTV in accordance with a preferred embodiment of the present invention having the aforementioned system will be described.

A display clock signal is generated from a 27 MHz reference clock signal restored from a video signal transmitted from a transmitter through a transport decoder using the PLL. The reference clock signal is 1/1000 divided in the 1/1000 divider 2011 into a 27 KHz frequency signal, and 1/1001 divided in the 1/1001 divider 2012 into a 26.96 KHz frequency signal. One of the signals from the 1/1000 divider 2011 and the 1/1001 divider 2012 is selected by a control signal from the phase agreement detecting part 203, i.e, a clock selecting signal and provided to the first phase difference detecting part 2021. The phase difference detecting part 2021 detects a phase difference of the clock signals from the switching part 2014 and the third divider (1/2750 divider) 2013 and provides to the loop filter part 2022 which provides an oscillation control signal to the first, and second local oscillators 1021 and 1022. The first local oscillator 1021 and the second local oscillator 1022 having the oscillation control signal provided from the loop filter part 2022 generate a frequency signal of $(2750/1000) \times f_{27MHz} = 74.25$ MHz and a frequency signal of $(2750/1001) \times f_{27MHz} = 74.176$ MHz, respectively. In this instance, the first, and second local oscillators 1021 and 1022 receive a signal clk0_p and clk1_p(see FIGS. 6a and 6b) respectively and provide a signal clk0 and clk1(see FIGS. 6c and 6d) to the second phase difference detecting part 2031 in the phase agreement detecting part 203, respectively. The second phase difference detecting part 2031 detects a difference of phases Ep(see FIG. 6i) of the signals clk0 and clk1 and provides to the comparing part 2032, and the comparing part 2032 provides a display clock selecting signal disp_clk_sel(see FIG. 6e) to the switching part 2014 and the selecting part 101 according to the phase difference. Each of the first, and second D type latches 1014 and 1015 in the selecting part 101 is provided with the clock selecting signal inverted in the third inverter 1013 at a D terminal thereof. The clock signals clk0 and clk1 from the first, and second local oscillators 1021 and 1022 respectively are inverted in the first, and second inverters 1011 and 1012 and provided to the first, and second D type latches 1014 and 1015 respectively at CP terminals thereof. Signals from the first, and second D type latches 1014 and 1015 and signals from the first, and second local oscillators 1021 and 1022 are received to the multiplexer 1016, and the multiplexer 1016 selects the clock signal from the first local oscillator 1021 when the clock selecting signal is "0" and the clock signal from the second local oscillator 1022 when the clock selecting signal is "1". That is, when a video format of a received video signal is changed from 59.94 Hz to 60 Hz or vice versa, the phase difference detecting part 203 detects the phase difference of the two clock signals from the first, and second local oscillators 1021 and 1022 and generates a clock selecting signal according to the phase difference. The selecting part 101 selects a clock signal from 74.25 MHz, and 74.176 MHz clock signals clk(see FIG. 6h) from the first, and second local oscillators 1021 and 1022 in response to the clock selecting signal. The clock signal from the selecting part 101 is provided to the third divider (1/2750 divider) 2013 and, on the same time, provided to the display part as a display clock signal. In other words, in the device for generating a clock in an HDTV of the present invention, the display clock signal is changed according to a video format contained in a received video signal. That is, one of the plurality of local oscillators in agreement with the video format of the presently received video signal is selected to generate a corresponding clock signal, and, if a video signal having another video format is received, another local oscillator corresponding to the video signal is turned on, in which the display clock signal should also be changed. To this purpose, the second phase detecting part 2031 in FIG. 5 detects a phase difference of a phase of the clock signal from each of the local oscillators and a phase of the reference clock signal and provides the display clock selecting signal disp_clk_sel when there is no phase difference. And this display clock selecting signal disp_clk_sel causes to select a local oscillator which generates a clock signal in agreement to a video signal having another video format. In this instance, as shown in FIGS. 6c, 6d and 6e, the time when the display clock signal in agreement to the new video format is generated is in a low section of the clock signal coming next to the display clock selecting signal disp_clk_sel. As shown in FIG. 6g, the display clock signal clk1' in agreement to the new video format is generated in a low section of the clock signal coming next to the display clock selecting signal disp_clk_sel. It can be known from FIG. 6i that there is a portion in every 1000 clocks, in which the display clock signals of different formats of 59.94 Hz and 60 Hz are in agreement to each other.

As has been explained, the device and method for generating a clock of the present invention is an implementation of device and method for generating a clock which can decode many kinds of video format. The device and method for generating a clock of the present invention detects a phase difference of two clock signals when video formats of received video signals are changed and changes over a switch from one format to another in low sections of following clock signals where there are no phase difference between the two clock signals. Accordingly, a stable supply of a display clock signal can be made possible in agreement to the presently received video signal.

It will be apparent to those skilled in the art that various modifications and variations can be made in the device and method for generating a clock in an HDTV receiver of the present invention without departing from the spirit or scope of the invention. Thus, it is intended that the present invention cover the modifications and variations of this invention provided they come within the scope of the appended claims and their equivalents.

What is claimed is:

1. A device for generating a clock in a HDTV receiver, the device comprising:
   a clock generating part for generating a plurality of clock signals corresponding to a plurality of television signal frame rates and for selecting and outputting a first one of the plurality of clock signals under the control of a produced clock selecting signal, wherein the clock signal that is selected and outputted at a first moment in time corresponds to the frame rate of the television signal that is being received at that first moment in time; and
   a controlling part for producing said clock selecting signal, said controlling part causing said generating part to select and output a different one of said plurality of clock signals at a next moment, wherein different one of the plurality of clock signals is selected and outputted only after the phase of the first clock signal and the phase of the second clock signal come into agreement with each other.

2. A device as claimed in claim 1, wherein said device receives a reference clock signal having a frequency of 27 MHz.

3. A device as claimed in claim 1, wherein the frame rate of the first received video signal is one of 59.94 Hz and 60 Hz and the frame rate of the next received video signal is the other one of 59.94 Hz and 60 Hz.

4. A device as claimed in claim 1, wherein the selection between the first and second clock signals is made during the occurrence of low periods in both signals.

5. A device for generating a clock in an HDTV receiver comprising:
   a local oscillating part for generating frequency signals corresponding to a plurality kinds of video signals having frame rates different from one another received at the HDTV receiver in response to a provided oscillation control signal;
   a dividing part for dividing the reference clock signal of the presently received video signal by a first dividing ratio into a first divided signal and the display clock signal from the selecting part by a second dividing ratio into a second divided signal in response to the clock selecting signal;
   an oscillation controlling part for detecting a phase difference of the first divided signal and the second divided signal and providing the oscillation control signal to the local oscillating part; and,
   a phase agreement detecting part for providing the clock selecting signal at a time when phases of two signals of the plurality of frequency signals corresponding to the present video signal and the just prior video signal come to an agreement.

6. A device as claimed in claim 5, wherein the reference clock signal has a frequency of 27 MHz.

7. A device as claimed in claim 5, wherein the plurality kind of video signals include a video signal having a 59.94 Hz frame rate and a video signal having a 60 Hz frame rate.

8. A device as claimed in claim 5, wherein the first dividing ratio is either 1/1000 or 1/1001.

9. A device as claimed in claim 5, wherein the dividing part includes,
   a first dividing for 1/1000 dividing a presently received reference clock signal,
   a second divider for 1/1001 dividing the presently received reference clock signal,
   a third divider for 1/2750 dividing the display clock signal from the selecting part and providing the second divided signal, and
   a switching part for providing either one of signals from the first divider and the second divider to the oscillation controlling part as the first divided signal in response to the clock selecting signal.

10. A device as claimed in claim 5, wherein the local oscillating part includes at least two local oscillators.

11. A device as claimed in claim 10, wherein the local oscillating part includes,
   a first local oscillator for providing a 74.25 MHz frequency signal in response to the oscillation control signal and the frame rate of the provided video signal, and
   a second local oscillator for providing a 74.176 MHz frequency signal in response to the oscillation control signal and the frame rate of the provided video signal.

12. A device as claimed in claim 5, wherein the oscillation controlling part includes,
   a first phase difference detecting part for detecting a phase difference of the first demultiplied signal and the second demultiplied signal, and a loop filter part for providing an oscillation control signal corresponding to the phase difference.

13. A device as claimed in claim 5, wherein the phase agreement detecting part includes, a second phase difference detecting part for detecting a phase difference of two frequency signals corresponding to the present video signal and the just prior video signal from the plurality of frequency signals from the local oscillating part, and a comparator for comparing a signal from the second phase difference detecting part and a reference signal in providing the clock selecting signal.

14. A device as claimed in claim 5, wherein the selecting part includes, a first inverter for inverting a first frequency signal of the plurality of frequency signals, a second inverter for inverting a second frequency signal of the plurality of frequency signals, a third inverter for inverting the clock signal, a first latch for latching an output of the third inverter according to an output of the first inverter, a second latch for latching the clock selecting signal according to an output of the second inverter, and a multiplexer for selecting one from the first, and second frequency signals in response to signals from the first, and second latches.

15. A device as claimed in claim 14, wherein each of the first, and second latches includes a D type flipflop.

16. A device as claimed in claim 14, wherein the multiplexer includes, a first AND gate for receiving the first frequency signal and a signal from the first latch, a second AND gate for receiving the second frequency signal and a signal from the second latch, and an OR gate for receiving outputs of the first, and second AND gates and generating the clock selecting signal.

17. A method for generating a clock in a HDTV, the method comprising the steps of:

receiving a video signal;

determining when the frame rate of the video signal being received changes from a first frame rate to a second frame rate;

detecting when the phase of the first clock signal comes into phase with the phase of the second clock signal after the determined change in frame rate, wherein the first clock signal corresponds to the first frame rate and the second clock signal corresponds to the second frame rate;

selecting the second clock signal in place of the first clock signal when the detecting step determines that the first clock signal has come into phase with the phase of the second clock signal after the determined change in frame rate.

18. A method as claimed in claim 17, further comprising a step of displaying the received video signal in response to the selected clock signal.

19. A method as claimed in claim 17, wherein the first frame rate is one of 59.94 Hz and 60 Hz and the second frame rate is the other one of 59.94 Hz and 60 Hz.

20. A method as claimed in claim 17, further comprising a step of receiving a reference clock signal having a frequency of 27 MHz.

* * * * *